March 7, 1933. W. H. BAILEY 1,900,393
DAM CONSTRUCTION
Filed Feb. 9, 1931
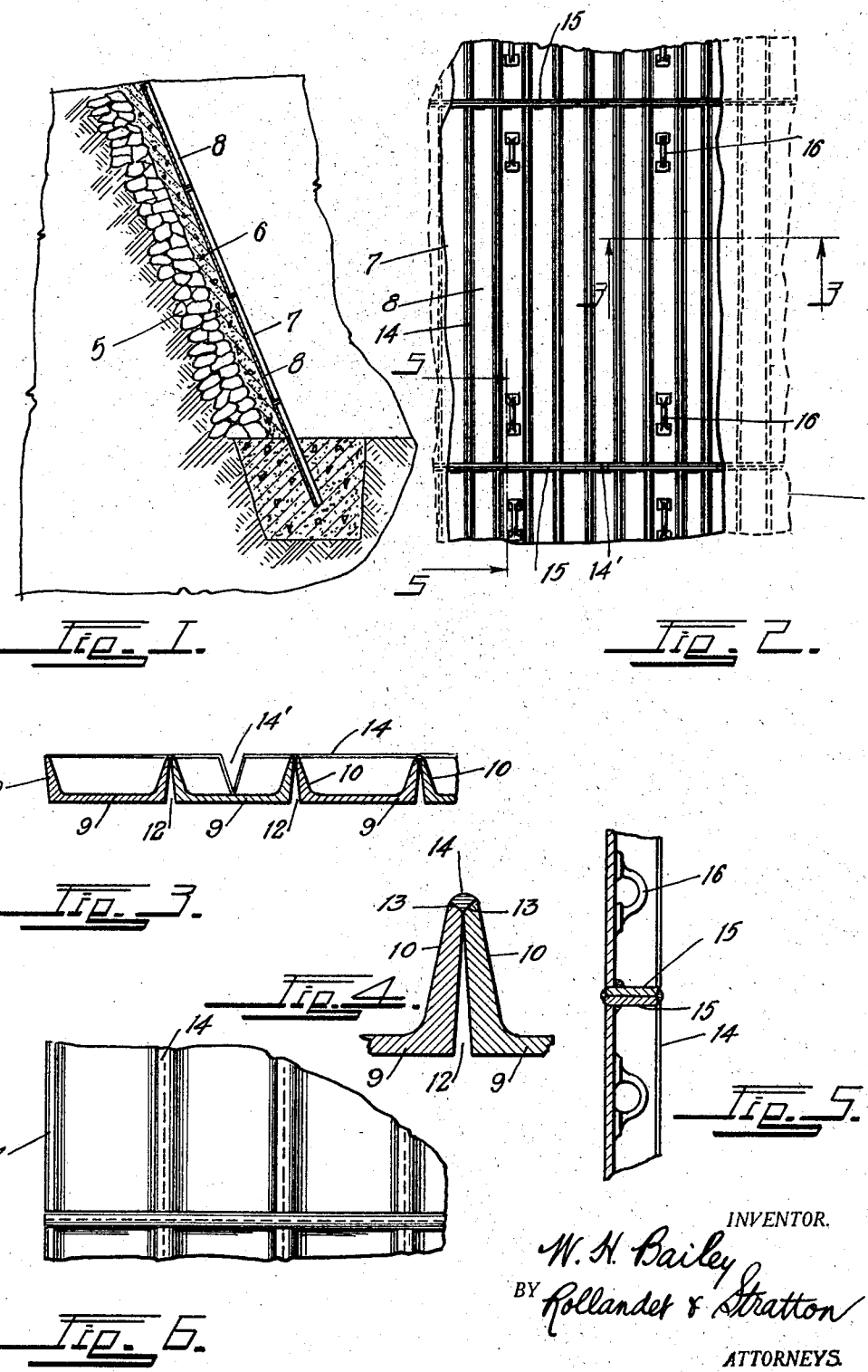
INVENTOR.
W. H. Bailey
BY Rollander & Stratton
ATTORNEYS.

Patented Mar. 7, 1933

1,900,393

UNITED STATES PATENT OFFICE

WILLIAM H. BAILEY, OF PUEBLO, COLORADO, ASSIGNOR TO THE COLORADO FUEL AND IRON COMPANY, OF DENVER, COLORADO

DAM CONSTRUCTION

Application filed February 9, 1931. Serial No. 514,492.

This invention relates to dam construction and its principal object is to provide in connection with a dam, a metal facing of novel construction, capable of expansion and contraction.

Another object of the invention is to provide a dam facing composed of battens of fabricated shapes fastened together into a continuous body.

A further object resides in providing a dam-facing of the above described character, the shapes of which consist of structural channels.

Another object resides in providing for the purpose of a dam-facing, channels of special shape adapted for the formation of contraction and expansion spaces, when fastened together in adjoining relation to each other.

A further object is to provide channels of the above stated form, with special means for their connection by welded joints, and still other objects reside in details of construction and in novel and advantageous arrangements and combinations of parts as will fully appear in the course of the following description.

In the accompanying drawing,

Figure 1 represents a cross-section of a dam structure provided with a metal facing made in accordance with the present invention, Figure 2, a fragmentary face view of the facing, Figure 3, an enlarged section on the line 3—3, Figure 2, Figure 4, a further enlarged section of adjoining portions of the shapes of which the facing is composed, Figure 5, an enlarged section taken on the line 5—5, Figure 2, and Figure 6, a further enlarged face-view of a portion of the facing shown in Figure 2.

Similar reference numerals designate corresponding parts throughout the views.

Referring first to Figure 1, the dam structure consists of a rock-filled body 5 having a hand-set rock face 6 on the upstream side of the dam, which slopes at an angle and is covered with a layer of smooth-laid concrete to provide a support for the metal facing. The facing designated in its entirety by the numeral 7, is composed of battens 8 of fabricated structural shapes interconnected by welding as will hereinafter be more fully described. In the construction shown in the drawing, the shapes 9 are in the form of structural channels, the flanges 10 of which slant outwardly with respect to their webs to provide sloping outer surfaces which when the channels are placed together flange-to-flange, provide clearances 12 for the expansion and contraction of the facing of which the channels are a part.

The channels are, moreover, beveled at the tops of their flanges, as at 13, in such a manner that when the channels are placed together, as stated hereinbefore, the beveled edges of the flanges of adjoining channels will form V-shaped grooves which, in the construction of the facing, facilitate welding the channels together, and produce a type of welded joint that will approximate the strength of the structure.

In constructing the dam-facing, the channels 9 are placed flange-to-flange in one horizontal plane and the touching flanges are welded together by a deposit of welding metal 14 in the V-shaped grooves formed by the beveled tops of the flanges. Across the ends of each batten are welded plates or series of plates 15, provided with clearance spaces 14' to take care of transverse expansion and contraction. The work of making the battens may be done in the shop and the battens thus produced are afterward welded together in the field, to form the facing of the dam-structure.

It will be understood that the channels and the battens produced by interconnection thereof, may be of any desired dimensions that are practical for transportation.

Handles 16 preferably made of metal straps, may be welded to the battens to facilitate manipulation.

In the field, the battens are placed in their proper position with relation to each other against the cement coat surface of the dam, in which position the flanges of the channels project outwardly.

After being thus placed together, the battens are welded one to another, forming a continuous metal facing. In order to produce a water-tight joint, the facing may be set into a trench around its periphery and concreted in place.

It is preferred to use copper-bearing steel for the shapes and other parts of which the facing is composed. The battens may be painted for further protection and all welding should be done in a manner to insure water-tight joints.

Having thus described my invention it is to be understood that variations in the form of the shapes or the battens and in the manner of their interconnection may be resorted to within the scope of the hereunto appended claims.

It is to be understood that the words "shapes", "structural shapes", "channels" and "structural channels" as used in the description and the appended claims, refer to the articles of manufacture commonly known by engineers, architects and mechanics by these terms and commonly used in the production of structures of different kinds.

I claim:

1. A metallic facing for a dam having a flat upstream face consisting of a series of channels each having a flat web and outwardly flared flanges, said channels being arranged to lie side by side with the edges of the flanges of adjacent channels in contact whereby to leave expansion spaces substantially triangular in cross section, said channels having their webs lying throughout against said upstream face and extending vertically thereof.

2. A metallic facing for a dam having a flat upstream face consisting of a series of channels each having a flat web and outwardly flared flanges, said channels being arranged to lie side by side with the edges of the flanges of adjacent channels in contact whereby to leave expansion spaces substantially triangular in cross section, said channels having their webs lying throughout against said upstream face and extending vertically thereof, the contacting edges of said flanges being beveled outwardly to provide a groove at each pair of contacting edges, and welding metal filling said grooves and uniting the contacting edges of the flanges.

3. A metallic facing for a dam having a flat upstream face consisting of a series of channels each having a flat web and outwardly flared flanges, said channels being arranged to lie side by side with the edges of the flanges of adjacent channels in contact whereby to leave expansion spaces substantially triangular in cross section, said channels having their webs lying throughout against said upstream face and extending vertically thereof, and transverse plates extending across the ends of the series of channels and welded thereto, said plates being provided with notches extending from their free edges to the webs of said channels to permit longitudinal expansion and contraction of the transverse plates.

4. A metallic facing for a dam having a flat upstream face consisting of a series of channels each having a flat web and outwardly flared flanges, said channels being arranged to lie side by side with the edges of the flanges of adjacent channels in contact whereby to leave expansion spaces substantially triangular in cross section, said channels having their webs lying throughout against said upstream face and extending vertically thereof, the contacting edges of said flanges being beveled outwardly, to provide a groove at each pair of contacting edges, welded metal filling said grooves and uniting the contacting edges of the flanges, and transverse plates extending across the ends of the series of channels and welded thereto, said plates being provided with notches extending from their free edges to the webs of said channels to permit longitudinal expansion and contraction of the transverse plates.

5. A structural element adapted to form a facing for a structure having a flat face and comprising a batten or panel consisting of a series of metal channels each having a flat web and outwardly flared flanges, said channels being arranged side by side with the edges of the channels secured together and the webs of the channels lying in the same plane whereby the batten may lie flat against said flat face and whereby expansion spaces triangular in cross section are formed between adjacent channel flanges.

6. A structural element adapted to form a facing for a structure having a flat face and comprising a batten or panel consisting of a series of metal channels each having a flat web and outwardly flared flanges, said channels being arranged side by side with the edges of the channels secured together and the webs of the channels lying in the same plane whereby the batten may lie flat against said flat face and whereby expansion spaces triangular in cross section are formed between adjacent channel flanges, said channels having their ends coterminous, and metallic closure strips extending across the ends of said channels from side to side of the batten and secured to said webs and flanges at the channel ends, said closure strips being each provided with a notch extending from the free edge of the strip to a channel web whereby to provide means for permitting lateral expansion and construction of the strips.

In testimony whereof I hereunto affix my signature.

WILLIAM H. BAILEY.